United States Patent [19]

Imamura et al.

[11] Patent Number: 5,434,682
[45] Date of Patent: Jul. 18, 1995

[54] IMAGE SENSOR

[75] Inventors: Masaya Imamura; Hiromi Ogata; Kensuke Sawase, all of Kyoto, Japan

[73] Assignee: Rohm Co., Ltd., Kyoto, Japan

[21] Appl. No.: 951,392

[22] Filed: Sep. 25, 1992

[30] Foreign Application Priority Data

Sep. 30, 1991 [JP] Japan .................... 3-250093
Jan. 6, 1992 [JP] Japan .................... 4-000020

[51] Int. Cl.$^6$ .................................. H04N 1/04
[52] U.S. Cl. .................. 358/474; 250/208.1; 358/483
[58] Field of Search ............ 358/474, 471, 213.11, 358/213.22, 482, 483, 484, 472; 250/208.1

[56] References Cited

U.S. PATENT DOCUMENTS

| 5,004,905 | 4/1991 | Yoshinouchi et al. | 250/208.1 |
| 5,136,150 | 8/1992 | Fukushima | 250/208.1 |
| 5,142,137 | 8/1992 | Kushino et al. | 250/208.1 |
| 5,194,725 | 3/1993 | Sawase et al. | 250/208.1 |

FOREIGN PATENT DOCUMENTS

| 0438104 | 7/1991 | European Pat. Off. . |
| 3716809 | 11/1987 | Germany . |
| 63-217870 | 9/1988 | Japan . |

Primary Examiner—Paul Ip
Attorney, Agent, or Firm—Wolf, Greenfield & Sacks

[57] ABSTRACT

There is provided an image sensor which can reduce loss in light emitted from a light emitting section toward an object to be sensed and also variability in the distribution of light and which can be produced with a small-sized structure with a reduced number of parts and with a decreased manufacturing cost. An optical path from the light emitting section to a transparent covering on which the object is to be placed is surrounded by a light reflecting portion. Light from the light emitting section can be irradiated onto the transparent covering without reduction in the amount of light while being repeatedly reflected by the light reflecting portion. The light reflected by the object is condensed by a condensing lens, the condensed light being then received by a light receiving section mounted on the same base plate as in the light emitting section. At the light receiving section, the light is converted into an electrical signal.

13 Claims, 5 Drawing Sheets

IMAGE SENSOR

BACKGROUND OF THE INVENTION

1. Field of the Invention

The present invention relates to an image sensor and particularly to an image sensor suitable for use in facsimile machines, optical character readers and the like. The image sensor of this invention comprises a light emitting section for emitting and irradiating light onto an object, a lens for condensing the light reflected by the object and a light receiving section for receiving the condensed light from the condensing lens.

2. Description of the Related Art

FIG. 1 shows a cross-sectional view of the primary parts of a conventional image sensor, taken along a plane perpendicular to the direction of scan. The image sensor comprises a main frame 50, a transparent covering (glass covering) 51 mounted on the open top of the main frame 50, a linear light emitting section 52 including a base plate 53 which is mounted in the main frame 50, and a light receiving section 54 including a base plate 55 which is mounted on the bottom of the main frame 50. The base plate 53 fixedly supports a resilient piece 57 which resiliently holds an elongated condensing lens (gradient index lens) 56 extending along the light receiving section 54 against the condensing lens mounting wall 50a of the main frame 50. The condensing lens 56 has its optical axis extending in a direction perpendicular to the plane of the transparent covering 51 and the base plate 55. The resilient piece 57 also supports and holds a cylindrical plastic lens 58 directly above the light emitting section 52, the cylindrical lens 58 extending along the length of the light emitting section 52.

In this image sensor, an object to be sensed (e.g. original document) A is brought into contact with the transparent covering 51. The light emitting section 52 emits a diffusing light which is condensed by the plastic lens 58. The condensed light is irradiated onto the original document A slantingly relative to the plane of the transparent covering 51 with an angle equal to about 45 degrees. The light is then reflected by the original document A in a direction perpendicular to the plane of the transparent covering 51. The reflected light passes through the condensing lens 56 and is then received by the light receiving section 54 directly below the lens 56. At the light receiving section 54, the light is converted into an electrical signal.

In the prior art image sensor, loss in the light can be reduced by using the condensing lens to condense the light from the light emitting section. However, the condensing lens is expensive. Since the diameter of the condensing lens can be reduced only to a limited level, it is difficult to reduce the entire system in size. There is a further problem that the distribution of light on the light receiving section has an increased variability. There is a still further problem that the material and assembling cost become expensive since the light emitting and receiving sections are separately disposed within the main frame at different locations. In order to overcome the just mentioned problem, it has been proposed that the light emitting and receiving sections are mounted on the same base plate. However, this proposal raises another problem in that the distance between the original document and the light emitting and/or receiving sections is increased to thus reduce the amount of light.

SUMMARY OF THE INVENTION

It is therefore an object Of the present invention to provide an improved image sensor which can provide a distribution of light having a reduced variability and more effectively conduct the light from the light emitting section to the transparent covering on which the original document is placed.

Another object of the present invention is to provide an improved image sensor of the aforementioned type which is of a small-size and inexpensive structure including a reduced number of parts.

To this end, the present invention provides an image sensor comprising a main frame, a transparent covering mounted on the main frame and adapted to be brought into contact with an object to be sensed, a light emitting section mounted within the main frame for irradiating light onto the object, a condensing lens for condensing the light reflected by the object, a light receiving section for receiving the condensed light from the condensing lens, and light reflecting means disposed to surround the optical path from the light emitting section to the transparent covering.

Even if the light emitted from the light emitting section diffuses, the light is reflected substantially into a condensed state by the light reflecting means surrounding its optical path. In other words, loss in the light irradiated onto the object can be reduced while at the same time the distribution of light in the region surrounded by the light reflecting means becomes uniform, resulting in reduced variability in the amount of light. Since the loss in the light is reduced by the light reflecting means, furthermore, the light emitting and receiving sections can be mounted on the same base plate. This means that the number of parts is decreased to reduce the cost and also that the entire image sensor can be reduced in size.

DETAILED DESCRIPTION OF THE PREFERRED EMBODIMENTS

Figure 1:
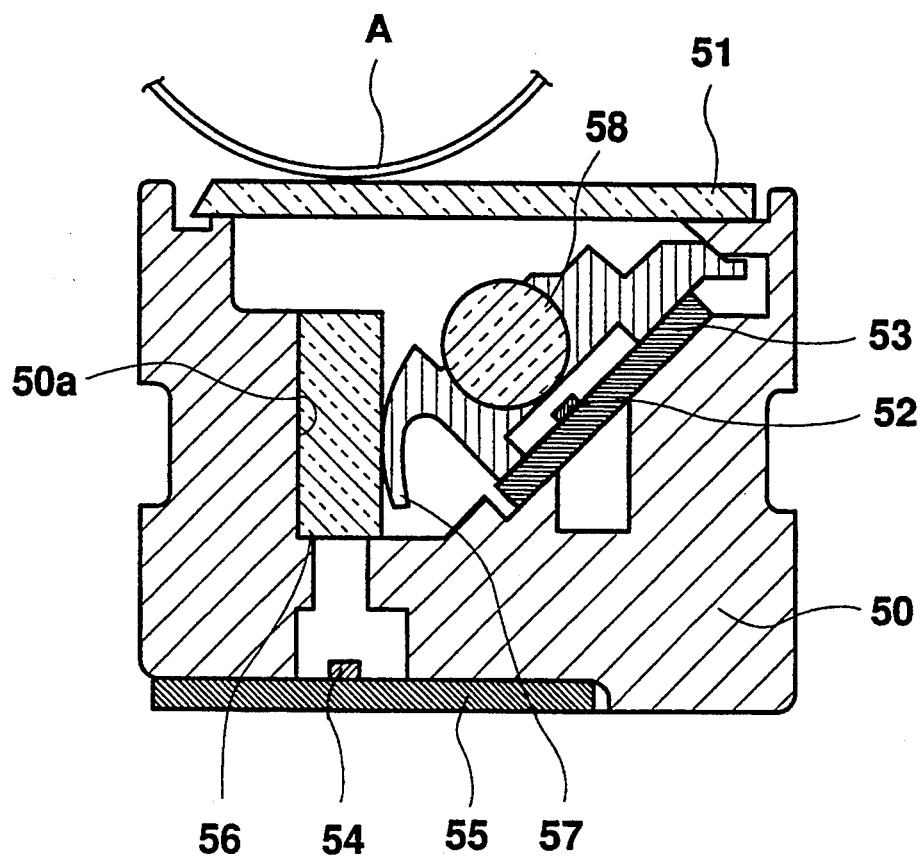
FIG. 1 is a cross-sectional view of the primary parts of an image sensor constructed in accordance with the prior art.
Figure 2:
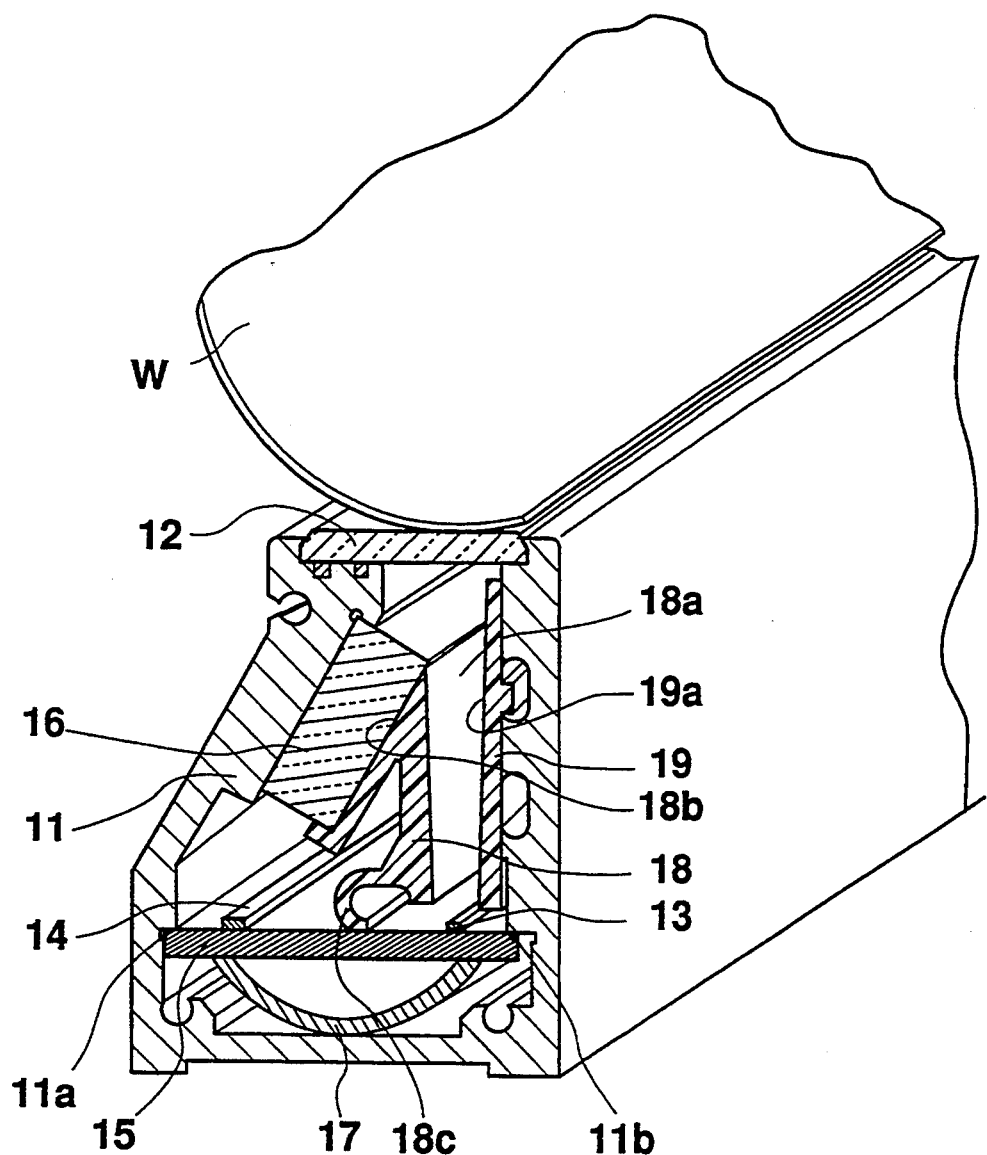
FIG. 2 is a cross-sectional view of the primary parts of one embodiment of an image sensor constructed in accordance with the present invention.

Referring to FIG. 2, there is shown an image sensor of the present invention which comprises a main frame 11 and a transparent covering (glass covering) 12 mounted on the open top of the main frame 11. Within the interior of the main frame 11, there are disposed a base plate 15, a linear light emitting section (LED chip or the like) 13 mounted on the base plate 15, a linear light receiving section (photodiode chip or the like) 14 mounted on the same base plate 15 and a condensing lens 16 having its length extending along that of the linear light receiving section 14 and being adapted to condense light reflected by an original document W on the transparent covering 12.

The base plate 15 is resiliently urged upwardly toward and engaged by shoulders 11a and 11b formed in the inner wall of the main frame 11 under the action of a U-shaped leaf spring 17 which is disposed in the lower portion of the main frame 11 as a resilient member. The top side edge of the base plate 15 can be used as a reference when it is held against the main frame 11. Therefore, the focusing of the light receiving section 14 relative to the condensing lens 16 can be improved irrespectively of the accuracy in the main frame 11. In the illustrated embodiment, the leaf spring 17 may comprise two spring sections each having its length substantially equal to one-half of the length of the main frame 11, each of the spring sections being inserted into the main frame through its corresponding open end.

The condensing lens 16 is disposed to have its optical axis inclined relative to the plane of the transparent covering 12 with a given angle. The condensing lens 16 is fixedly held against the inner wall of the main frame 11 by a lens holding portion 18b of a lens holder 18. The lower end of the lens holder 18 defines a separating wall 18c which can fixedly hold the base plate 15 and prevent the light from the light emitting section 13 from directly entering the light receiving section 14.

The main frame 11 further includes a light reflecting portion 19 mounted therein which has a light reflecting surface 19a for conducting the light from the light emitting section 13 to the original document W in an effective manner. The lens holder 18 includes a light reflecting surface disposed opposite to the light reflecting surface 19a of the light reflecting portion 19.

Figure 3:
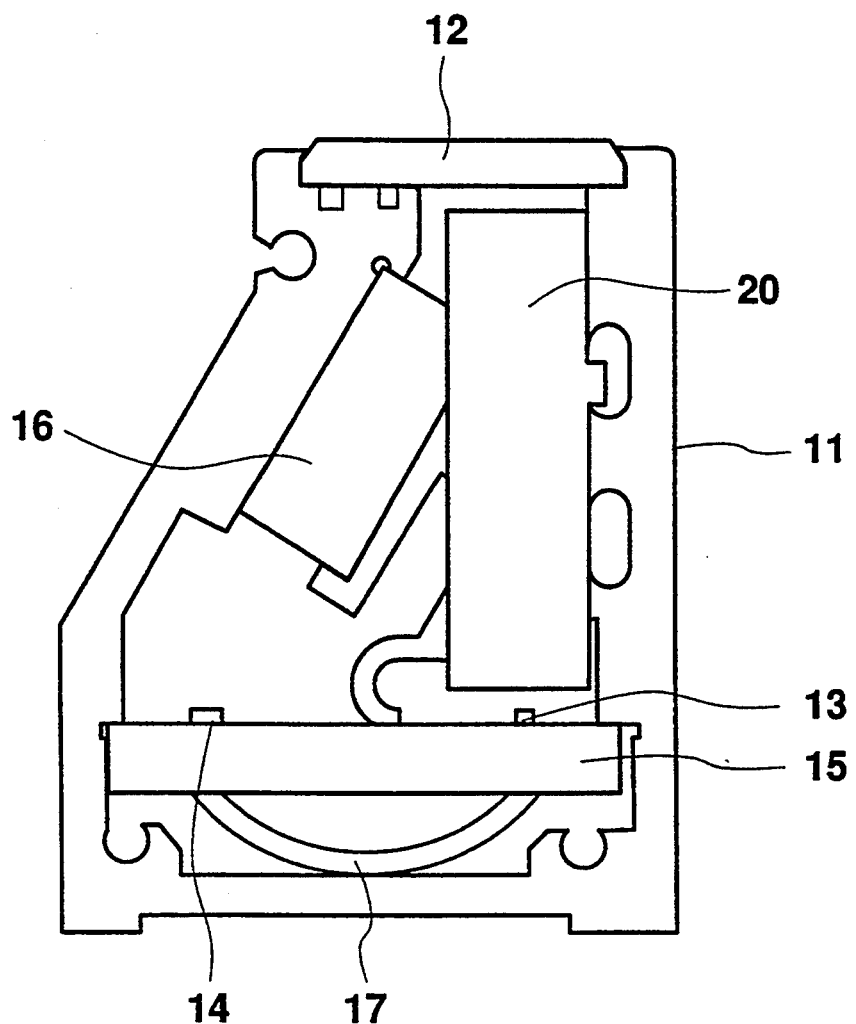
FIG. 3 is a side view showing the image sensor of FIG. 2 before end coverings are mounted thereon.

The base plate 15 has a length sufficient to support the linear light emitting and receiving sections 13, 14. The main frame 11 has a length sufficient to fully receive the base plate 15, with the opposite open ends thereof being closed by end coverings, each of which also includes a plate-like light reflecting surface 20, as shown in FIG. 3. In the illustrated image sensor, therefore, the optical path from the light emitting section 13 to the transparent covering 12 will be surrounded by the light reflecting surfaces 18a, 19a and 20 which define a light reflecting means surrounding the optical path from the light emitting section to the transparent covering. All the light reflecting surfaces 18a, 19a and 20 may be made of a colored (e.g. white-colored) material having a good reflectivity, such as polyacetal.

In such an arrangement, the light emitted from the light emitting section 13 irradiates the transparent covering 12 at its document reading region after it has been repeatedly reflected by the light reflecting surfaces 18a, 19 and 20. The light reflected by the original document W passes through the condensing lens 16 wherein the light is further condensed. The condensed light is then received by the light receiving section 14 wherein it is converted into an electrical signal.

Since the light from the light emitting section is irradiated onto the object after it has been reflected by the light reflecting means surrounding the optical path from the light emitting section to the transparent covering, the loss in the light can be reduced to make the distribution of light uniform, resulting in a large reduction of the variability therein. In addition, the entire image sensor can be small-sized and inexpensive since the light emitting section has no lens.

Figure 4:
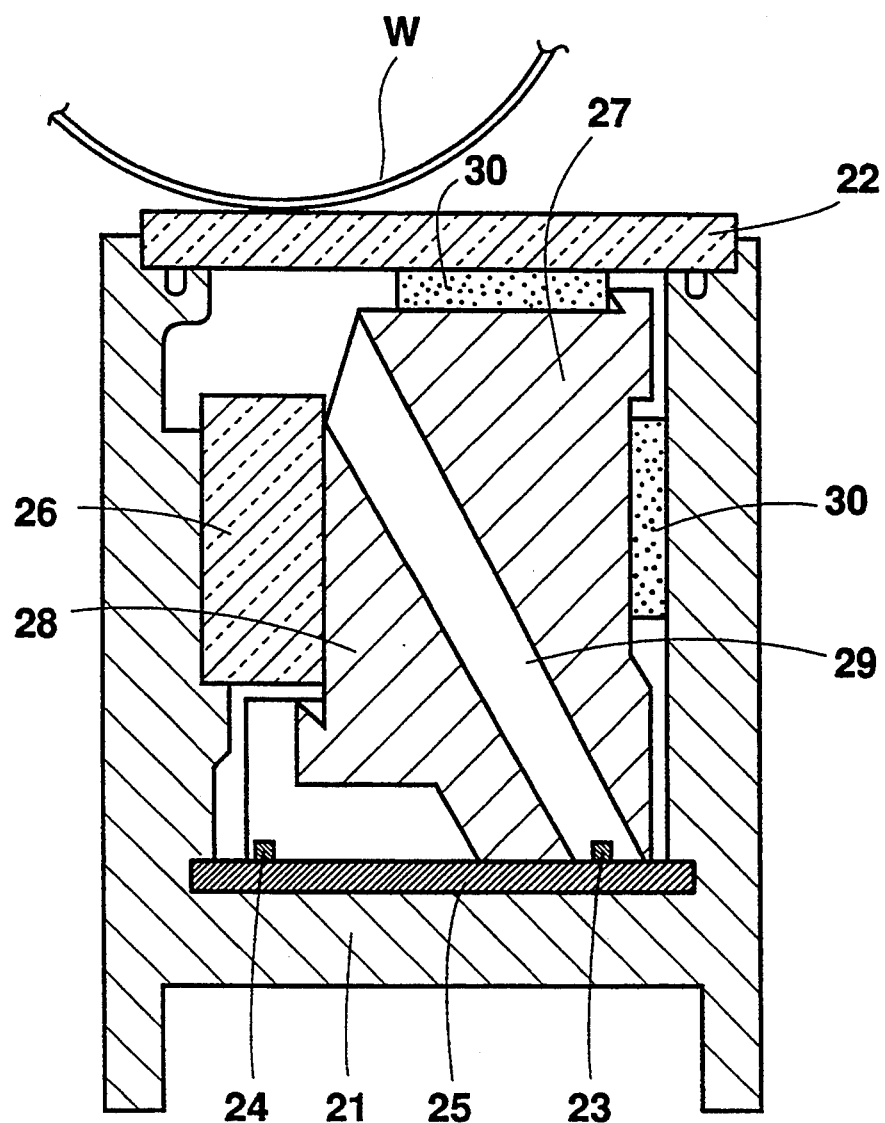
FIG. 4 is a cross-sectional view of the primary parts of another embodiment of an image sensor constructed in accordance with the present invention.

Referring next to FIG. 4, there is shown a second embodiment of an image sensor constructed in accordance with the present invention, which comprises a main frame 21 and a transparent covering (glass covering) 22 mounted on the open top of the main frame 21. Within the interior of the main frame 21, there are disposed a base plate 25, a linear light emitting section (LED chip or the like) 23 mounted on the base plate 25, a linear light receiving section (photodiode chip or the like) 24 mounted on the same base plate 25 and a condensing lens 26 having its length extending along that of the linear light receiving section 24 and being adapted to condense a light reflected by an original document W on the transparent covering 22.

The base plate 25 is fixedly secured to the inner bottom wall of the main frame 21 and fixedly supports the light emitting and receiving sections 23, 24 as through die-bonding while at the same time these sections 23 and 24 are wire-bonded to an electrically conductive pattern on the base plate 25. By modifying the conductive pattern, the base plate 25 may be formed into a size substantially equal to that of the light receiving base plate 55 in the prior art image sensor, even though the base plate 25 carries both the light emitting and receiving sections thereon. By locating both the light emitting and receiving sections 23, 24 on the same base plate 25, thus, less material needs to be used, resulting in reduction of the manufacturing cost.

The condensing lens 26 is arranged to have its optical axis perpendicular to the plane of the transparent covering 22.

The image sensor further comprises a light reflecting means for conducting the light from the light emitting section 23 to the transparent covering 22, the light reflecting means being formed by upper and lower members 27, 28, each of which has a triangular cross-section. Each of the upper and lower members 27, 28 includes a lower end which engages the base plate 25 at a position adjacent to the light emitting section 23. The upper ends of the upper and lower members 27, 28 extend near the transparent covering 22 with a gap being formed therebetween. The light emitting section 23 is located within the bottom of the gap. Thus, the gap will form an optical path 29. The upper and lower members 27, 28 are resiliently urged and held against the condensing lens 26 under the influence of two sponges, one of which is mounted on the inner sidewall of the main frame 21, the other of which is mounted at the position directly below the transparent covering 22.

The light from the light emitting section 23 slantingly enters the original document W on the transparent covering 22 after it has proceeded along the optical path 29 while being repeatedly reflected by the light reflecting means defined by the upper and lower members 27, 28. Thus, the variability in the light from the light emitting section 23 can be reduced. After the light has uniformly irradiated the original document W, the light is reflected by the original document W toward the condensing lens 26. At the condensing lens 26, the reflected light is condensed and directed to the light receiving section 24 wherein the light is converted into an electrical signal.

Since the light reflecting means for conducting the light from the light emitting section to the transparent covering is provided within the main frame, the light can be more effectively conducted from the light emitting section to the transparent covering. Thus, the light reflecting means can be made in an inexpensive and simple manner. Since the light enters the transparent covering after it has been repeatedly reflected by the light reflecting means, the variability of the light in the entire light emitting section can be substantially reduced. By mounting the light emitting and receiving sections on the same base plate, the number of parts can be reduced and the process of making image sensors can be simplified. This means that the manufacturing cost is reduced. Furthermore, the image sensor can be reduced in size.

Figure 5:
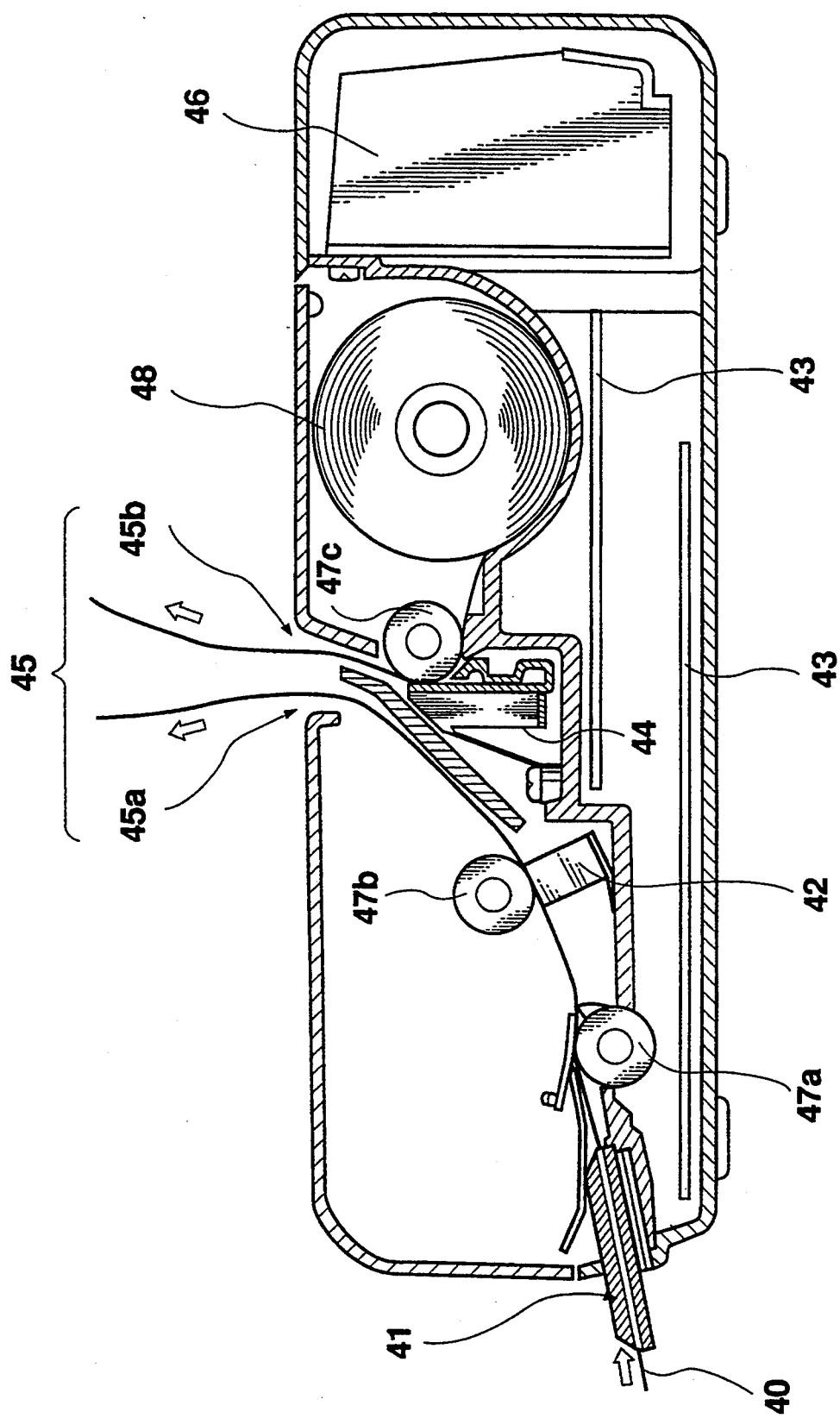
FIG. 5 is a cross-sectional view of the primary parts of a facsimile machine in which the image sensor of the present invention is mounted.

FIG. 5 shows the internal structure of a facsimile machine in which an image sensor having the aforementioned structure is mounted.

The facsimile machine comprises an original document supply section 41, an image sensor 42 functioning as an image reader, a base plate 43 including a control section for controlling the transmission and reception of information and the entire facsimile machine, a printing section 44, an original document discharge section 45 and a source of power 46.

On operation, an original document 40 is supplied from the supply section 41 to the interior of the facsimile machine under the action of platen rollers 47a and 47b. The image on the document 40 is read by the image sensor 42 which in turn converts the image information into electrical signals. The signals are outputted from the image sensor 42 to the control section. The electrical signals received by the control section are transmitted to any external receiver through a telephone line or the like. After the reading has been terminated, the original document is discharged externally through the discharge section 45a.

When any external signals are received by the control section, the latter controls the printing section 44 which in turn prints a transmitted image on a printing sheet 48. The printed sheet 48 is then discharged externally through the original document discharge section 45b.

When the image sensor of the present invention is incorporated into the facsimile machine as described, the entire facsimile machine can be reduced in size with the material cost being decreased.

We claim:

1. An image sensor for irradiating light to an object to be sensed and for converting the reflected light from said object into an electrical signal representative of an image on said object, said image sensor comprising:
   (a) a transparent covering on which said object is to be places;
   (b) a light emitting section for irradiating light onto said object through said transparent covering;
   (c) a condensing lens for receiving and condensing the light reflected by said object;
   (d) a light receiving section for receiving and converting the condensed light from said condensing lens into an electrical signal;
   (e) a single base plate on which both the light emitting section and the light receiving section are mounted;
   (f) light reflecting means provided to surround an optical path from said light emitting section to said transparent covering; and
   (g) a main frame, said transparent converting being mounted on the open top of said main frame and said light emitting section, condensing lends, light receiving section and light reflecting means being arranged within the interior of said main frame; wherein said light reflecting means includes a lens holder portion that urges and holds said condensing lens against an inner wall of said main frame, the lens holder portion having a first wall that abuts the condensing lens and second wall that faces the optical path.

2. An image sensor as defined in claim 1 wherein said light reflecting means completely surrounds said optical path.

3. An image sensor as defined in claim 1, wherein a lower portion of said main frame includes an internal shoulder for engaging a portion of said base plate, wherein said base plate is biased and held against said internal shoulder.

4. An image sensor as defined in claim 3, further comprising a leaf spring for biasing said base plate against said internal shoulder.

5. The image sensor of claim 1, wherein the transparent covering lies in a plane, and the light emitting section is positioned so that a line from the objective to the light emitting section is perpendicular to the plane.

6. The image sensor of claim 1, wherein said light reflecting means includes a second portion having a first wall that faces a side wall of the main frame and a second wall that faces the optical path.

7. The image sensor of claim 6, wherein a resilient member is provided between the first wall of the second portion and the main frame.

8. The image sensor of claim 6, wherein the resilient member is a sponge.

9. An electronic instrument comprising an image sensor for irradiating light to an object to be sensed and for converting the reflected light from said object into an electrical signal representative of an image on said object, said image sensor comprising:
   (a) a transparent covering on which said object is to be placed;
   (b) a light emitting section for irradiating light onto said object through said transparent covering;
   (c) a condensing lens for receiving and condensing the light reflected by said object;
   (d) a light receiving section for receiving and converting the condensed light from said condensing lens into an electrical signal;
   (e) a single base plate on which both the light emitting section and the light receiving section are mounted;
   (f) light reflecting means provided to surround an optical path from said light emitting section to said transparent covering; and
   (g) a main frame, said transparent converting being mounted on the open top of said main frame and said light emitting section, condensing lends, light receiving section and light reflecting means being arranged within the interior of said main frame; wherein said light reflecting means includes a lens holder including a portion that urges and holds said condensing lens against an inner wall of said main frame, the lens holder having a first wall that abuts the condensing lens and a second wall that faces the optical path.

10. An electronic instrument as defined in claim 9 wherein said light reflecting means completely surrounds said optical path.

11. An electronic instrument as defined in claim 9, wherein a lower portion of said main frame includes an internal shoulder for engaging a portion of said base plate, wherein said base plate is biased against said internal shoulder.

12. An electronic instrument as defined in claim 11, further comprising a leaf spring for biasing said base plate against said internal shoulder.

13. An electronic instrument as defined in claim 9 wherein said electronic instrument is a facsimile machine.

* * * * *